United States Patent
Tsumori et al.

(10) Patent No.: US 7,122,090 B2
(45) Date of Patent: Oct. 17, 2006

(54) PROCESS FOR PREPARING RUBBER SHEET AND TREAD AND STUDLESS TIRE USING SAME

(75) Inventors: Isamu Tsumori, Kobe (JP); Akira Minakoshi, Kobe (JP); Naohiko Kikuchi, Kobe (JP); Yoshikazu Tanaka, Kobe (JP); Takuzo Iwata, Kobe (JP); Norio Taniguchi, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 110 days.

(21) Appl. No.: 10/607,269

(22) Filed: Jun. 27, 2003

(65) Prior Publication Data

US 2004/0035515 A1 Feb. 26, 2004

(30) Foreign Application Priority Data

Jun. 28, 2002 (JP) ............................. 2002-190988
Jun. 28, 2002 (JP) ............................. 2002-190989

(51) Int. Cl.
*B29C 47/00* (2006.01)
*B29D 30/58* (2006.01)
*B60C 9/12* (2006.01)
*B60C 11/00* (2006.01)

(52) U.S. Cl. .............................. 156/128.6; 152/209.4; 152/212; 152/458; 264/108; 156/244.18; 156/264; 156/266

(58) Field of Classification Search ........... 156/244.18, 156/264, 266, 128.6, 129; 264/108, 152; 152/209.4, 212, 458
See application file for complete search history.

(56) References Cited

U.S. PATENT DOCUMENTS

| | | | | |
|---|---|---|---|---|
| 4,056,591 A | * | 11/1977 | Goettler et al. | 264/108 |
| 4,057,610 A | | 11/1977 | Goettler et al. | |
| 5,429,487 A | * | 7/1995 | Tajima et al. | 264/108 |
| 5,603,367 A | | 2/1997 | Watanabe | |
| 2004/0035514 A1 | * | 2/2004 | Kikuchi et al. | 152/209.4 |

FOREIGN PATENT DOCUMENTS

| | | |
|---|---|---|
| EP | 0 408 941 A2 | 1/1991 |
| EP | 1072446 * | 1/2001 |
| EP | 1 097 825 A2 | 5/2001 |
| JP | 60-219034 * | 11/1985 |
| JP | 2-274602 A | 11/1990 |

(Continued)

*Primary Examiner*—Steven D. Maki
(74) *Attorney, Agent, or Firm*—Birch, Stewart, Kolasch & Birch, LLP

(57) ABSTRACT

The present invention provides a studless tire excellent in performance on ice and snow in which digging friction is improved without losing adhesion friction. The studless tire has a tread comprising specific short fiber or plate-like material dispersed in diene rubber so as to be oriented in the tread thickness direction, wherein when measured at 25° C. the tread has a complex elastic modulus $E1$ in the tread thickness direction, and the sheet has a complex elastic modulus $E\alpha$ in the extrusion direction and a complex elastic modulus $E\beta$ in a 90° direction from the extrusion direction, when the rubber composition is made into 2 mm sheets with a roller and these moduli fulfill the following equation, $$60 \leq (E1 - E\beta)/(E\alpha - E\beta) \times 100 \leq 100$$

and the tread has a specific tread rubber hardness. The tire is obtained using a tread prepared by extruding a rubber composition containing diene rubber and specific short fiber or plate-type material in a tube shape, thereby orienting the short fiber in the circumferential direction of the tube shaped rubber, then cutting the obtained rubber sheet parallel to the extrusion direction, rotating each piece 90° and laminating.

2 Claims, 6 Drawing Sheets

FOREIGN PATENT DOCUMENTS

| | | |
|---|---|---|
| JP | 6-16004 A | 1/1994 |
| JP | 6-88303 B2 | 9/1994 |
| JP | 7-024932 A | 1/1995 |
| JP | 7-57539 B2 | 6/1995 |
| JP | 2001-39104 A | 2/2001 |
| JP | 2001-138718 * | 5/2001 |
| JP | 2001-310396 * | 11/2001 |
| JP | 2002-113764 A | 4/2002 |
| JP | 2002-127227 * | 5/2002 |
| JP | 2002-210842 * | 7/2002 |
| WO | WO 01/17747 A1 | 3/2001 |

* cited by examiner

PROCESS FOR PREPARING RUBBER SHEET AND TREAD AND STUDLESS TIRE USING SAME

BACKGROUND OF THE INVENTION

The present invention relates to a process for preparing a rubber sheet in which short fiber is oriented in the circumferential direction of tube shaped rubber. Also, the present invention relates to a studless tire superior in performance on snow and ice and a process for preparing the tread of the studless tire.

In recent years, studless tires without spikes have come to be widely used as tires for driving on icy roads. In a studless tire, in order to improve performance on ice, road digging friction and adhesion friction must be increased. Therefore, various studies have been conducted to raise the friction coefficient of tread rubber to icy roads.

Also, a tire which uses as the tread rubber, a rubber in which short fiber (organic short fiber or inorganic short fiber) is compounded, is known to improve the strength, rigidity and abrasion resistance of a tire.

JP-A-2001-315504 suggests a method for preparing a tread by rolling a rubber composition in which short fiber is dispersed with a calender roll and folding the obtained sheet. However, when tread rubber is extrusion molded by a calender roll or extruder, the compounded short fiber is oriented in the extrusion direction, that is along the circumferential direction of the tire tread. As a result, the road scratching effect of short fiber does not function effectively in a large part of the tread rubber which touches the road and so the tire tread of this method is hardly used for a studless tire which requires high digging friction.

Also, there is a method in which short fiber compounded rubber containing short fiber with improved road scratching effect is used in a studless tire. Japanese Patent No. 2637887 suggests using thick short fiber having a diameter of 0.1 to 0.3 mm and a low aspect ratio as the short fiber. When thick short fiber is used, orienting the short fiber when extruding is difficult and so compared with conventional rubber in which short fiber is oriented in the tire circumferential direction, the chances of the ends of the short fiber coming into contact with the road increase, improving the scratching effect to a certain degree. However, the scratching effect is improved only to the degree in which orientation of the short fiber is lost and sufficient performance on ice cannot be obtained.

JP-A-2000-168315 suggests a method for improving the road scratching effect of short fiber and grip performance on ice by orienting short fiber perpendicularly to the tread surface (tread thickness direction). In this method, short fiber is oriented in the pushing direction near the siping by pushing a knife blade into an unvulcanized tread when vulcanizing the tire.

However, in all of the above methods, the orientation degree of short fiber is insufficient or producing a large number of tires is difficult in reality.

In this way, a tire excellent in performance on ice and snow, in which adhesion friction, digging friction and scratching friction on icy and snowy roads are simultaneously improved or obtained in a balanced manner, is currently still not available.

SUMMARY OF THE INVENTION

The object of the present invention is to provide a studless tire excellent in performance on ice and snow in which digging friction (road scratching effect) is improved without losing adhesion friction.

The present invention also aims to provide a process for preparing a rubber sheet suitable for a tire tread, which is extremely effective in improving digging friction (road scratching effect) and abrasion resistance without losing adhesion friction and can significantly improve performance on ice and snow of the tire. Further, the present invention provides a process for preparing a tread.

In order to achieve these goals, intensive research has been conducted focusing on the materials to compound and orientation degree. As a result, significant improvement in digging friction (road scratching effect) without losing adhesion friction and improvement in performance on ice and snow of the tire were found to be possible, by compounding short fiber or plate-like material of a Moh's hardness of 3 to 7 dispersed in tread rubber so as to be oriented in the tread thickness direction, wherein the tread rubber has a hardness measured at −10° C. of 45 to 70 degrees and when measured at 25° C., a complex elastic modulus E1 in the tread thickness direction and the sheet has a complex elastic modulus Eα in the extrusion direction and a complex elastic modulus Eβ in a 90° direction from the extrusion direction, when the rubber composition is made into a 2 mm sheet with a roller and these moduli fulfill the following equation $$60 \leq (E1-E\beta)/(E\alpha-E\beta) \times 100 \leq 100.$$

Also, obtaining continuous extruded articles of rubber containing short fiber oriented differently from those obtained by the usual extrusion method was found to be possible by extruding a rubber composition containing a specific amount of short fiber having a specific size under specific conditions using an extruder equipped with a special extrusion head.

That is, the present invention relates to a process for preparing a rubber sheet having a thickness of at most 20 mm, which comprises extruding a rubber composition containing 2 to 50 parts by weight of short fiber having an average fiber diameter of 1 to 100 μm and average length of 0.1 to 5 mm based on 100 parts by weight of diene rubber in a tube shape, thereby orienting the short fiber in the circumferential direction of the tube shaped rubber; wherein the tube shaped rubber sheet is further cut at one point in sidewall in the extrusion direction to obtain a rubber sheet having a complex elastic modulus Ea in the extrusion direction and complex elastic modulus Eb in the 90° direction from the extrusion direction measured at 25° C. which fulfill the following equation $$1.1 \leq Eb/Ea$$

Also, the present invention relates to a process for preparing a rubber sheet which comprises the steps of cutting the rubber sheet obtained by the above process parallel to the extrusion direction and rotating each piece 90° and laminating.

Also, the present invention relates to a process for preparing a tread, which comprises the steps of extruding a rubber composition for a tread containing short fiber or plate-like material of a Moh's hardness of 3 to 7 into a sheet, cutting the sheet perpendicularly to the extrusion direction and rotating each piece of the rubber sheet 90° and laminating, wherein when measured at 25° C. the tread has a complex elastic modulus E1 in the tread thickness direction, and the sheet has a complex elastic modulus Eα in the extrusion direction and a complex elastic modulus Eβ in a 90° direction from the extrusion direction, when the rubber composition is made into 2 mm sheets with a roller and these moduli fulfill the following equation, $$60 \leq (E1-E\beta)/(E\alpha-E\beta) \times 100 \leq 100$$

and the tread has a tread rubber hardness measured at −10° C. of 45 to 70 degrees.

Also, the present invention relates to a process for preparing a tread, which comprises the steps of extruding a rubber composition for a tread containing short fiber or plate-like material of a Moh's hardness of 3 to 7 into a tube, forming a sheet by cutting one point in the sidewall of the tube shaped rubber sheet in the extrusion direction, cutting the sheet parallel to the extrusion direction and rotating each piece of the rubber sheet 90° and laminating, wherein when measured at 25° C. the tread has a complex elastic modulus E1 in the tread thickness direction, and the sheet has a complex elastic modulus Eα in the extrusion direction and a complex elastic modulus Eβ in a 90° direction from the extrusion direction, when the rubber composition is made into 2 mm sheets with a roller and these moduli fulfill the following equation, $$60 \leq (E1-E\beta)/(E\alpha-E\beta) \times 100 \leq 100$$

and the tread has a tread rubber hardness measured at −10° C. of 45 to 70 degrees.

Also, the present invention relates to a studless tire having a tread comprising a rubber sheet obtained by the above process.

Also, the present invention relates to a studless tire having a tread obtained by the above process.

Also, the present invention relates to a studless tire having a tread comprising diene rubber and short fiber or plate-like material of a Moh's hardness of 3 to 7 dispersed in the diene rubber so as to be oriented in the tread thickness direction, wherein when measured at 25° C. the tread has a complex elastic modulus E1 in the tread thickness direction, and the sheet has a complex elastic modulus Eα in the extrusion direction and a complex elastic modulus Eβ in a 90° direction from the extrusion direction, when the rubber composition is made into 2 mm sheets with a roller and these moduli fulfill the following equation, $$60 \leq (E1-E\beta)/(E\alpha-E\beta) \times 100 \leq 100$$

and the tread has a tread rubber hardness measured at −10° C. of 45 to 70 degrees.

The short fiber or plate-like material in the studless tire is preferably short fiber having an average fiber diameter of 1 to 100 µm and average length of 0.1 to 5 mm or plate-like material having an average thickness of 1 to 90 µm and average length of 0.1 to 5 mm.

DETAILED DESCRIPTION

Figure 1A:
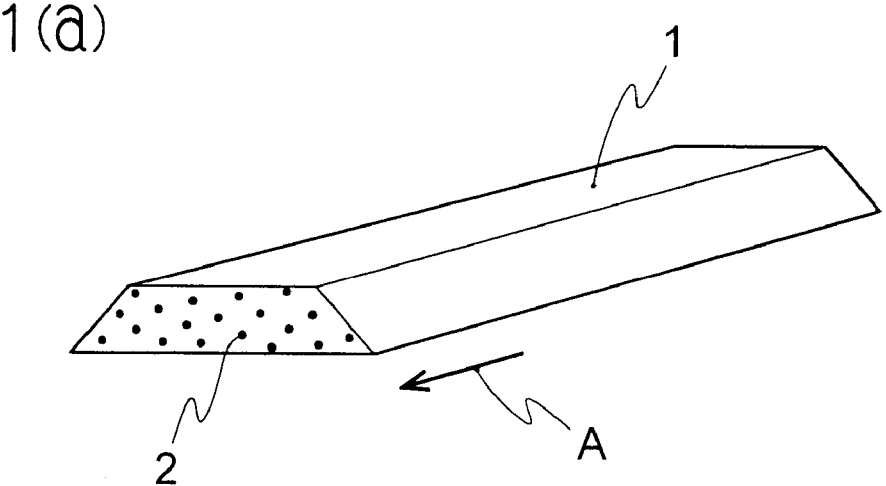
FIG. 1 is a cross sectional view of a tire tread.

The studless tire of the present invention has a tread comprising specific short fiber or plate-like material dispersed in diene rubber so as to be oriented in the tread thickness direction.

As the diene rubber, a commonly used rubber can be used. Examples are natural rubber (NR), isoprene rubber (IR), butadiene rubber (BR) and styrene-butadiene rubber (SBR) and these may be used alone or by kneading two or more kinds.

The short fiber or plate-like material dispersed in the tread preferably has a Moh's hardness of 3 to 7, more preferably 5 to 7. When the Moh's hardness of the short fiber or plate-like material is less than 3, the fiber is softer than ice and so the road scratching effect is insufficient. When the Moh's hardness is more than 7, the fiber becomes harder than asphalt and so the road is shaved, causing the problem of powder dust.

The average fiber diameter of the short fiber is preferably 1 to 100 µm, more preferably 3 to 50 µm. When the average fiber diameter of the short fiber is less than 1 µm, the flexural strength is insufficient and a sufficient road scratching effect cannot be expected. Also, the area having high ground pressure created on the tread surface by short fiber oriented in the tread thickness direction cannot sufficiently be created, as the cross sectional area of the short fiber is small. On the other hand, when the average fiber diameter exceeds 100 µm, the rubber becomes hard and adhesion friction tends to decrease. Also, the function of pushing away the film of water between frozen roads and the tire tread surface becomes inferior and adhesion friction does not function sufficiently.

The average thickness of the plate-like material is preferably 1 to 100 µm, more preferably 1 to 90 µm, most preferably 3 to 45 µm. When the average thickness of the plate-like material is less than 1 µm, the flexural strength is insufficient and a sufficient road scratching effect cannot be expected. On the other hand, when the average thickness exceeds 100 µm, the rubber becomes hard and adhesion friction tends to decrease.

The average length of the short fiber or plate-like material is preferably 0.1 to 5 mm, more preferably 0.1 to 3 mm. When the average length of the short fiber or plate-like material is shorter than 0.1 mm, the protruding length from the rubber surface becomes short and the road scratching effect tends to become insufficient. Also, even when subjected to surface treatment, the short fiber tends to fall out from the tread surface when driving and the effect of pushing away the film of water tends to decrease. On the other hand, when the average length of the short fiber or plate-like material is longer than 5 mm, dispersing and orienting the short fiber or plate-like material becomes difficult and the processability of the rubber tends to decrease.

The average aspect ratio of the short fiber or plate-like material is preferably 100 to 10000, more preferably 500 to 5000. When the average aspect ratio is less than 100, orienting the short fiber or plate-like material within the diene rubber is difficult and so the road scratching effect tends to be difficult to obtain. When the average aspect ratio is more than 10000, the fiber becomes foreign matter within the diene rubber due to a long major axis and the mechanical fatigue characteristics tend to be inferior. The aspect ratio is, in the case of short fiber, the ratio of the average length to the average fiber diameter (average length÷average fiber diameter) or in the case of the plate-type material, the ratio of the average maximum major axis to the average thickness (average maximum major axis÷average thickness).

The short fiber is preferably organic and/or inorganic short fiber. An example of the organic short fiber is polyester fiber. Examples of the inorganic short fiber are glass fiber, carbon fiber, metal fiber (tungsten, iron, copper, platinum, stainless steel) and potassium titanate fiber. Of these, inorganic short fiber is preferable in that the rigidity of the fiber is high and digging friction can be improved. Furthermore, among inorganic fiber, non-metal inorganic short fiber is preferable from the viewpoint that non-metal inorganic short fiber hardly damages roads and is suitable for ensuring contact between the tread and icy and snowy roads from the viewpoint that the difference in abrasion rate of the rubber and non-metal inorganic short fiber is small.

Examples of the plate-like material are aluminum whisker, potassium titanate whisker, aluminum borate whisker, titanate oxide type whisker and zinc oxide whisker.

The short fiber or plate-like material may be one kind of short fiber or plate-like material or a combination of two or more kinds. Also, a combination of short fiber and plate-like material may be used. Of the above short fiber or plate-like material, glass fiber and carbon fiber are preferably used from the viewpoint that the fiber breaks into a suitable length and becomes short when kneading the rubber and can be easily dispersed and oriented. Furthermore, glass fiber is preferable from the viewpoint that rubber having a suitable ratio of complex elastic modulus can be easily obtained.

The upper limit of the amount of short fiber or plate-like material is preferably 50 parts by weight, more preferably 30 parts by weight, most preferably 20 parts by weight, based on 100 parts by weight of diene rubber. On the other hand, the lower limit of the amount is preferably 2 parts by weight, more preferably 3 parts by weight. When the amount of short fiber or plate-like material is less than 2 parts by weight, the amount of short fiber or plate-like material formed on the tread surface becomes small and the road scratching effect tends to be insufficient. Also, the difference in the complex elastic modulus Ea in the extrusion direction of the obtained rubber sheet and Eb in the 90° direction from the extrusion direction of the obtained rubber sheet becomes small and the ratio of complex elastic modulus of the rubber sheet Eb/Ea becomes less than 1.1. As a result, the tread prepared from the obtained rubber sheet is ineffective in removing the film of water between the tread surface and the ground plane and adhesion friction and scratching and digging friction are not improved. On the other hand, when the amount is more than 30 parts by weight, the rubber becomes hard and extremely rigid and processability tends to decrease. Also, when the amount of short fiber is more than 50 parts by weight, cohesiveness as rubber tends to decrease and so obtaining rubber in the form of continuous extruded articles tends to become difficult.

When E1 represents the complex elastic modulus in the tread thickness direction in the tread and Eα represents the complex elastic modulus in the extrusion direction and Eβ represents the complex elastic modulus in a 90° direction from the extrusion direction in the sheet, when the rubber composition is made into 2 mm sheets with a roller, all measured at 25° C., the value of the following equation $$(E1-E\beta)/(E\alpha-E\beta) \times 100$$

is preferably at least 60, more preferably at least 80. When the value of the above equation is less than 60, orientation of the short fiber or plate-like material in the tread thickness direction cannot be obtained and friction on ice is insufficient.

In the above tread, the tread rubber hardness measured at −10° C. is preferably 45 to 70 degrees, more preferably 50 to 65 degrees. When the hardness at −10° C. is less than 45 degrees, the rubber is soft at room temperature and so driveability on dry roads decreases. On the other hand, when the hardness is more than 70 degrees, the rubber itself becomes hard and performance on ice and snow decreases, as contact of the tread rubber surface with icy and snowy roads becomes inferior. Here, tread rubber hardness means the hardness in the tread thickness direction.

In the tread, the ratio of complex elastic modulus E1 in the tread thickness direction and complex elastic modulus E2 in the tire circumferential direction of the tread when measured at 25° C. (E1/E2) is preferably 1.1 to 4, more preferably 1.2 to 3.5. When the ratio of E1/E2 is less than 1.1, orientation of the short fiber or plate-like material in the tread thickness direction tends to be difficult to obtain and abrasion on ice tends to be insufficient. When the ratio of E1/E2 is more than 4, the tread becomes hard and processability tends to decrease.

The present invention provides a pneumatic tire excellent in driving performance on ice and snow in which digging friction is improved without losing adhesion friction by compounding short fiber or plate-like material to tread rubber and dispersing so as to be oriented in the tread thickness direction, wherein when measured at 25° C. the tread has a complex elastic modulus E1 in the tread thickness direction, and the sheet has a complex elastic modulus Eα in the extrusion direction and a complex elastic modulus Eβ in a 90° direction from the extrusion direction, when the rubber composition is made into 2 mm sheets with a roller and these moduli fulfill the following equation, $$60 \leq (E1-E\beta)/(E\alpha-E\beta) \times 100 \leq 100$$

Below, the process for preparing the tread of the present invention is described below.

A commonly used extrusion method is used as the method for preparing the tread. As shown in FIG. 1(a), when a tread is formed from a tread rubber sheet obtained by the usual method for preparing a rubber sheet such as simply extruding by using a roll, orientation direction A in the tread of short fiber or plate-like material 2 is the circumferential direction of the tread.

Figure 1B:
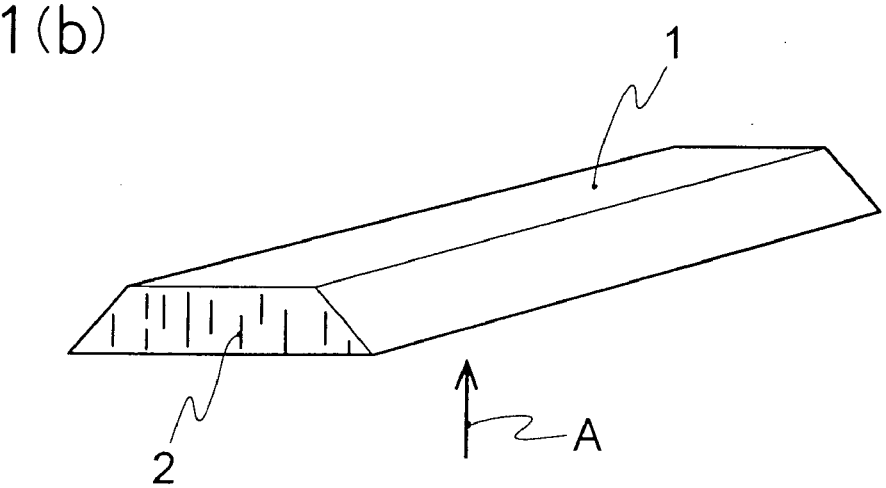
Figure 2:
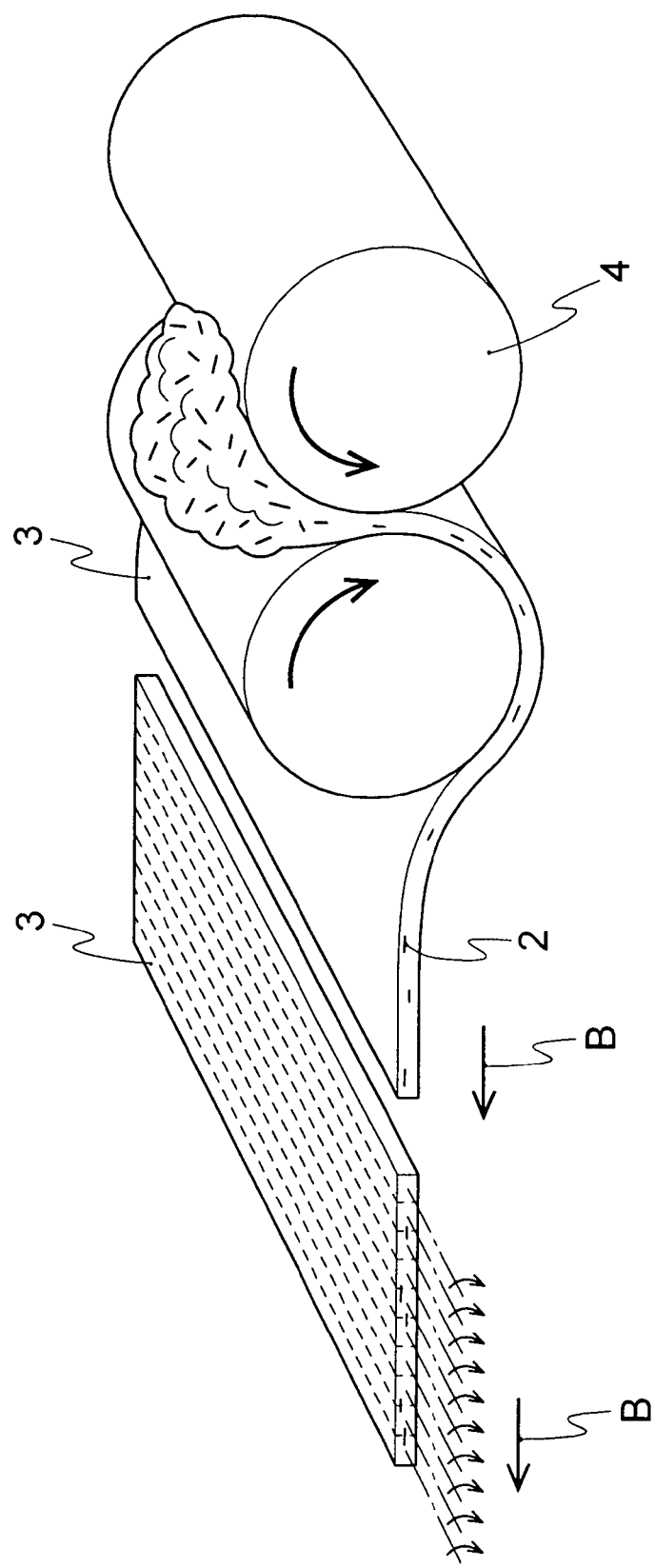
FIG. 2 is a diagram depicting the process for preparing the tread of the present invention.

On the other hand, as shown in FIG. 2, when a tread is formed from a tread rubber sheet obtained by the method comprising rolling a rubber composition containing short fiber or plate-like material with calender roll 4, cutting the obtained rubber sheet 3 perpendicularly to extrusion direction B and rotating each piece 90° and then laminating, orientation direction A of short fiber or plate-like material 2 in the tread is the tread thickness direction, as shown in FIG. 1(b).

Figure 3A:
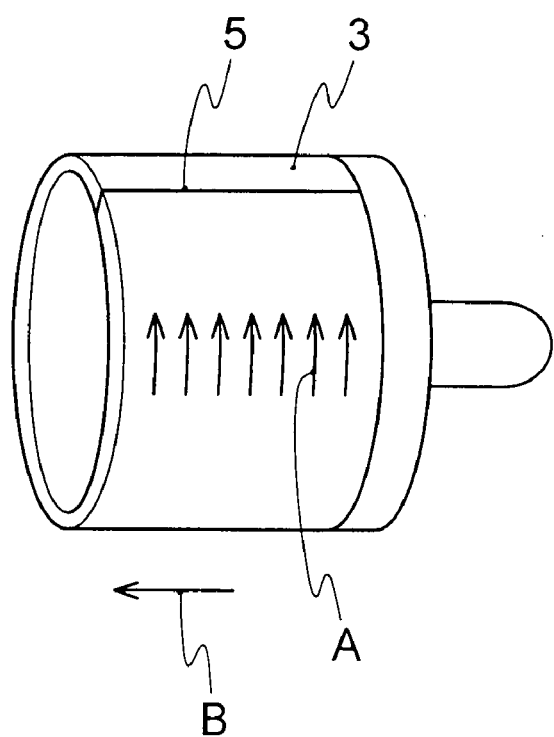
FIG. 3 is a diagram depicting the process for preparing the tread of the present invention.
Figure 3B:
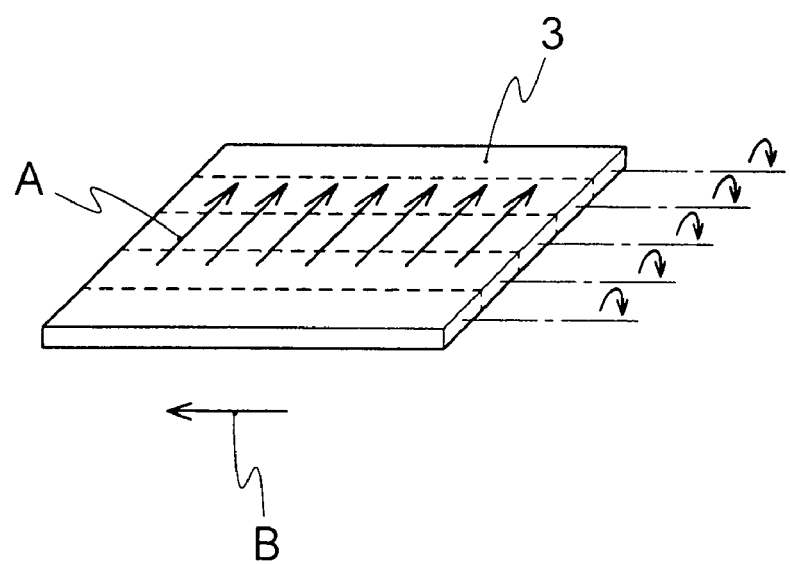

Also, as shown in FIG. 3(a), tube shaped rubber sheet 3 is formed by extruding a rubber composition for a tread containing short fiber or plate-like material 2 and cutting one point in the sidewall of the tube shaped rubber sheet in the extrusion direction (cut part 5). Then, as shown in FIG. 3(b), a tread rubber sheet is obtained by cutting sheet 3 parallel to extrusion direction B in small intervals and rotating each piece 90° and then laminating. Even when a tread is formed by the usual method using this rubber sheet, orientation direction A of short fiber or plate-like material 2 in the tread is the tread thickness direction, as shown in FIG. 1(b) and a tread superior in performance on ice can be obtained. Also, by using this rubber sheet as the base tread, a tire superior in driveability can be obtained.

In the mechanism of the method of extruding the tread rubber composition in a tube shape, the extruded rubber is pressed against the disc-shaped plate and spreads outward within the disc-shaped narrow space so short fiber or plate-type material 2 is oriented in a circumferential direction by pressure in this process of spreading. As a result, the short fiber or plate-type material is oriented in the circumferential direction of the tube and extruded, as shown in FIG. 3(a).

In the tread of the studless tire of the present invention, the process for orienting short fiber or plate-type material in the tread thcikness direction is not limited to the above method and another method may be used as long as the short fiber or plate-type material is oriented in the above direction.

Below, the process for preparing the tube shaped rubber sheet of the present invention is described referring to the drawings but the process for preparing the rubber sheet of the present invention is not limited thereto.

Figure 4:
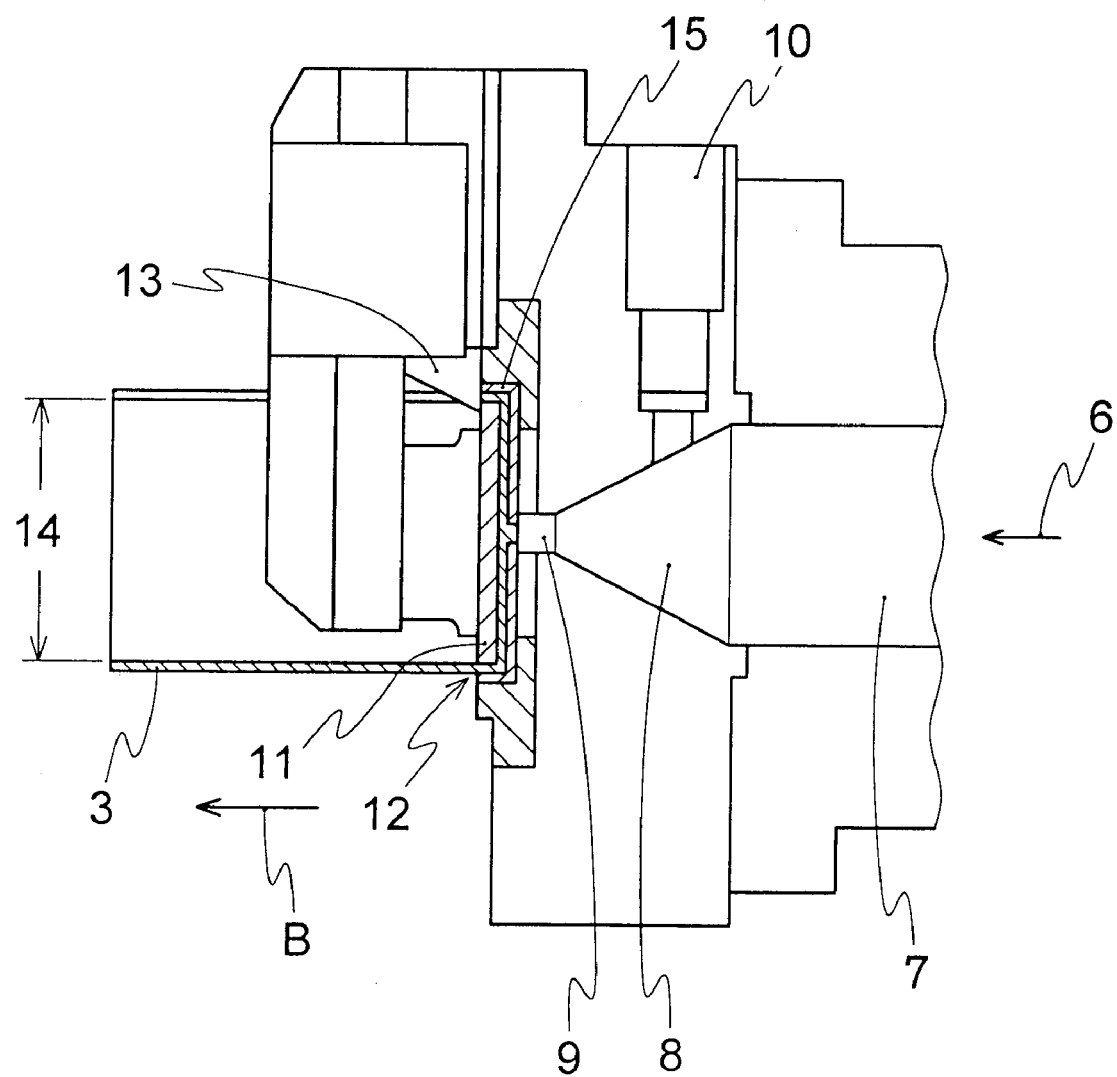
FIG. 4 is a cross sectional view of an apparatus having an extruder and an extrusion head used in the process for preparing the rubber sheet of the present invention.
Figure 5:
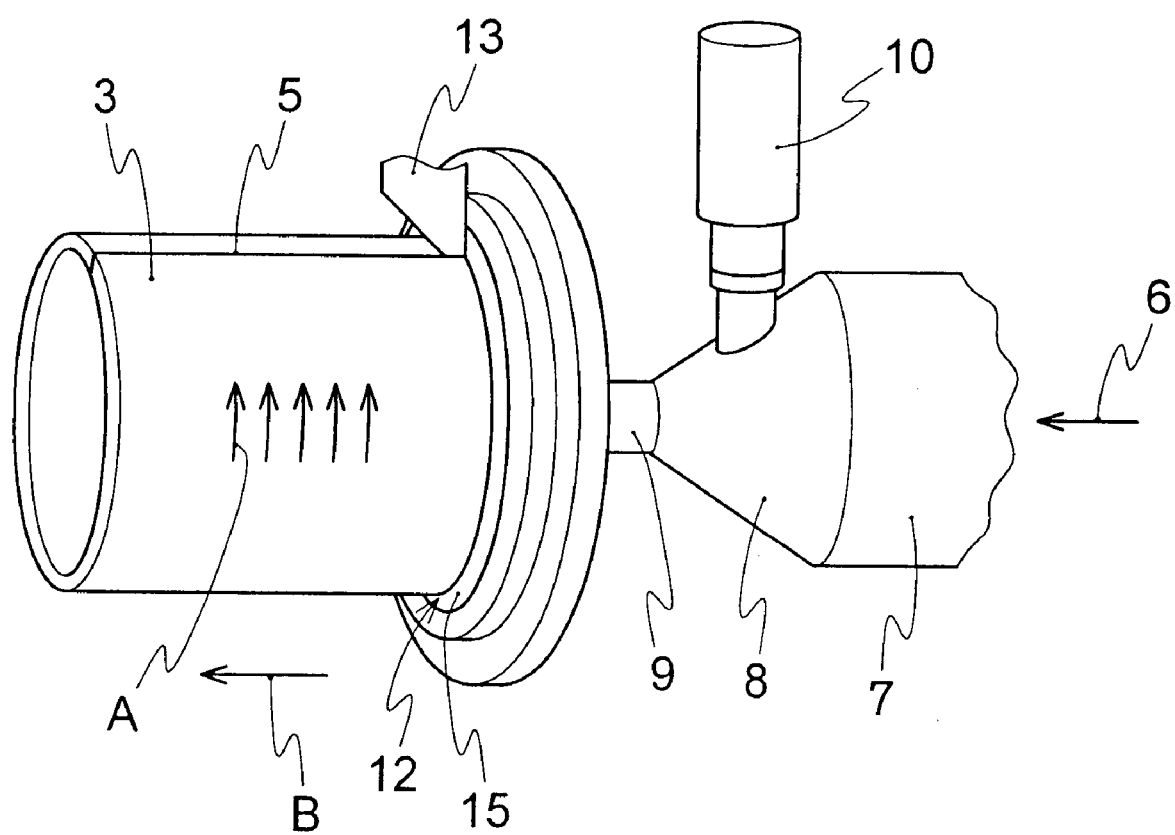
FIG. 5 is a partial perspective view of the apparatus of FIG. 4.

FIG. 4 is a cross sectional view of an embodiment of an apparatus having an extruder and an extrusion head used in the process for preparing the rubber sheet of the present invention. FIG. 5 is a perspective view depicting important parts of the apparatus depicted in cross sectional view FIG. 4.

As shown in FIG. 4, rubber composition 6 is transferred from screw part 7 to head part 8 and extruded from die 9. The pressure of the rubber composition in head part 8 is measured by rubber pressure meter 10 above head part 8.

Rubber composition 6 extruded from die 9 is pressed to the center of disc 11 and spreads into a circle along the space between disc 11 and outer wall 15 to become a sheet.

Then, the rubber sheet is extruded in a tube shape through tube shaped orifice 12. The extruded tube shaped rubber sheet 3 is extruded with one part being cut in the extrusion direction by knife 13.

The above apparatus has a special extrusion head comprising head part 8, die 9, disc 11, tube shaped orifice 12 and knife 13 and so the rubber is pressed to the center of disc 11 and spreads outward in a circle from the center when extruded from the die. At this time, the short fiber is oriented in the circumferential direction as the force of the rubber spreading in the circumferential direction is stronger than the force of moving outward. Due to the mechanism of rubber being extruded with the short fiber oriented in the circumferential direction of the tube, when the rubber is extruded in a tube, the short fiber is oriented in the circumferential direction of the tube in the tube shaped rubber sheet extruded from the head, as shown in FIG. 5. That is, by extruding the rubber composition in a tube shape using an apparatus equipped with the above head, a rubber sheet, in which short fiber is oriented in a the circumferential direction of the tube, is obtained.

The tube shaped rubber sheet preferably has a thickness of at most 20 mm, more preferably 3.0 to 10 mm. When the thickness of the rubber sheet is less than 3 mm, later, in the steps of cutting the sheet, rotating each piece 90° and laminating, workability tends to decrease. When the thickness of the rubber sheet exceeds 20 mm, the orientation of short fiber within the sheet becomes disorderly and some areas do not fulfill $Eb/Ea \geq 1.1$. As a result, the tread comprising the obtained rubber sheet is ineffective in removing the film of water between the tread surface and ground plane and adhesion friction and scratching and digging friction are not improved.

In the above apparatus, the ratio of tube inner diameter 14 and die diameter 9 (tube inner diameter/die diameter) is preferably set to at least 8. When the ratio of tube inner diameter/die diameter is less than 8, the orientation of short fiber tends to be disorderly.

As shown in FIG. 5, the tube shaped rubber sheet prepared by the apparatus of FIG. 4 is cut at one point in the extrusion direction (cut part 5) and so rubber sheet 3 is obtained, in which short fiber is oriented in orientation direction A which is perpendicular to extrusion direction B.

Figure 6:
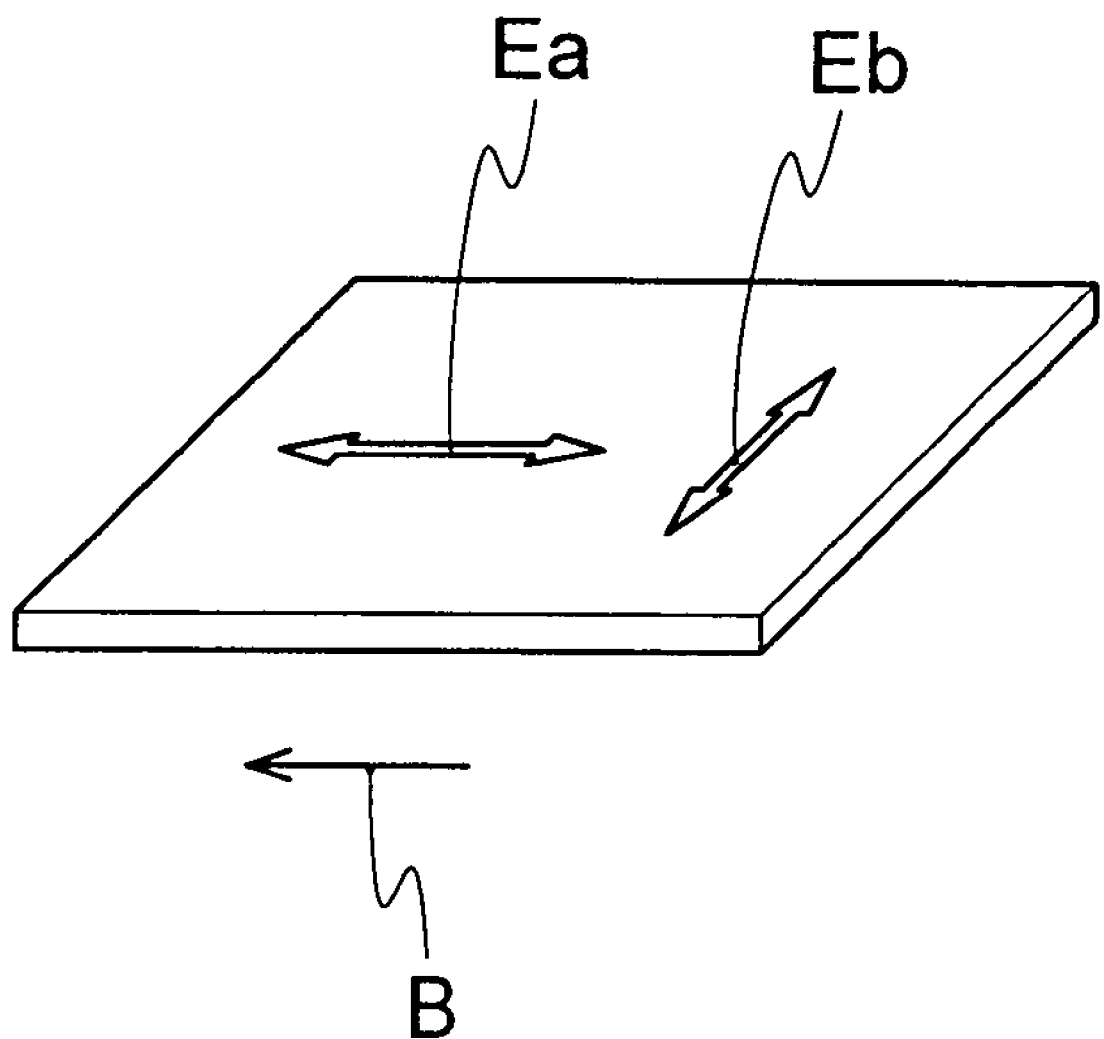
FIG. 6 is a perspective view depicting the directions for measuring the complex elastic modulus of the rubber sheet.

As shown in FIG. 6, regarding complex elastic modulus $Ea$ in the extrusion direction and elastic modulus $Eb$ in the 90° direction of the extrusion direction of the rubber sheet obtained by the process of the present invention measured at 25° C., $Eb/Ea$ is preferably at least 1.1, more preferably 1.1 to 4, most preferably 1.2 to 3.5. When $Eb/Ea$ is less than 1.1, the tread comprising the obtained rubber sheet cannot sufficiently form an area having high ground pressure in the ground plane. As a result, the effect of removing the film of water between the tread surface and the ground plane is little and adhesion friction and scratching and digging friction are not improved. When $Eb/Ea$ is more than 4, in the tread comprising the rubber sheet, the rigidity of the tread block becomes so high that the tread rubber surface cannot adhere to the icy and snowy roads and adhesion friction tends to decrease.

A rubber sheet in which short fiber is oriented perpendicularly to the rubber sheet surface is obtained by the process of the present invention and a tire having a tread comprising the rubber sheet is extremely effective in improving digging friction and abrasion resistance without losing adhesion friction and can significantly improve performance on ice and snow, as short fiber is sufficiently oriented in the tread thickness direction.

Also, the process for preparing the rubber sheet of the present invention is simple compared to conventional methods for orienting short fiber in the tread thickness direction. Therefore, the present invention has the advantage that tires having tread in which short fiber is oriented in the tread thickness direction can be mass produced.

The present invention is explained in detail based on Examples below, but the present invention is not limited thereto.

The materials used in Examples and Comparative Examples are described below.

Natural rubber (NR): RSS #3

Butadiene rubber (BR): UBEPOL BR150B available from Ube Industries, Ltd.

Carbon black: SHOWBLACK N220 available from Showa Cabot Co. Ltd.

Silica: Nipsil VN3 available from Nippon Silica Co., Ltd.

Silane coupling agent: Si69 (bis(3-triethoxysilylpropyl)tetrasulfide) available from Degussa Co.

Paraffin oil: Diana Process oil available from Idemitsu Kosan Co., Ltd.

Wax: SUNNOC available from Ouchi Shinko Chemical Industrial Co., Ltd.

Antioxidant: NOCRAC 6C available from Ouchi Shinko Chemical Industrial Co., Ltd.

Stearic Acid: Stearic acid available from NOF Corporation

Zinc oxide 1: Zinc Oxide Type 1 available from Mitsui Mining and Smelting Co., Ltd.

Zinc oxide 2: Zinc Oxide Type 2 available from Mitsui Mining and Smelting Co., Ltd.

Glass fiber 1: Moh's hardness 6, average fiber diameter 33 μm, average length 3 mm Glass fiber 2: Moh's hardness 6, average fiber diameter 200 μm, average length 0.5 mm Carbon fiber: Moh's hardness 6.5, average fiber diameter 18 μm, average length 5 mm Nylon fiber: Moh's hardness 2, average fiber diameter 8 μm, average length 3 mm Vulcanization Accelerator: Nocceler CZ available from Ouchi Shinko Chemical Industrial Co., Ltd.

Sulfur: powdery sulfur available from Tsurumi Chemicals Co., Ltd.

EXAMPLES 1 and 2 and COMPARATIVE EXAMPLES 1 to 4

(Process for Forming Tires)

In Comparative Examples 1 and 2, a rubber sheet in which short fiber was oriented in the tread circumferential direction (FIG. 1(a)) was prepared by the usual extrusion method according to the compounding ratio shown in Table 1. In Examples 1 and 2 and Comparative Examples 3 and 4, a rubber sheet in which short fiber was oriented in the tread thickness direction (FIG. 1(b)) was prepared by the method shown in FIG. 2. Tires were prepared by the usual method using the obtained rubber sheet in the tread. The following tests and evaluation were conducted using the obtained tire.

(Complex Elastic Modulus)

The complex elastic modulus was measured using a viscoelasticity spectrometer made by Iwamoto Corporation under the conditions of a temperature of 25° C., frequency of 10 Hz, initial strain of 10% and dynamic strain of 1%. The samples used for measurement was a piece of rubber having a size of 1.0 mm in thickness, 4 mm in width and 5 mm in length which was cut out from the tire tread. The complex elastic modulus in the tread thickness direction was defined as E1 and the complex elastic modulus in the tire circumferential direction was defined as E2.

When making tread rubber into a 2 mm sheet with a roller under the above conditions, the complex elastic modulus in the extrusion direction was defined as Eα and the complex elastic modulus in the 90° direction (right angle) of the extrusion direction was defined as Eβ.

(Performance on Ice)

A tire of a size of 195/65R15 was prepared and mounted on a Japanese front engine/rear wheel drive automobile with an engine size of 2000 cc. Then, the brake stopping distance at a speed of 30 km/h on a board of ice was measured. With Comparative Example 1 as the basis, performance on ice was evaluated by the index found from the following equation. The larger the index is the better the performance on ice.

(Brake stopping distance of Comparative Example 1)÷(Brake stopping distance of each Example)×100

Before conducting the test, driving to break in the surface of the tire was conducted for 200 km in each Example and Comparative Example.

(Performance on Snow)

The lap time of a snowy course with the above automobile was measured and with Comparative Example 1 as the basis, performance on snow was evaluated by the index found from the following equation. The larger the index is the better the performance on snow.

(Lap time of Comparative Example 1)÷(Lap time of each Example)×100

Before conducting the test, driving to break in the surface of the tire was conducted for 200 km in each Example and Comparative Example.

(Rubber Hardness)

A sample was taken from the thickness direction of the tread and the rubber hardness was measured under an atmosphere of −10° C. using a type A hardness meter according to JIS K6253.

The results are shown in Table 1.

TABLE 1

|  | Ex. 1 | Ex. 2 | Com. Ex. 1 | Com. Ex. 2 | Com. Ex. 3 | Com. Ex. 4 |
|---|---|---|---|---|---|---|
| Composition (parts by weight) | | | | | | |
| NR | 60 | 60 | 60 | 60 | 60 | 60 |
| BR | 40 | 40 | 40 | 40 | 40 | 40 |
| Carbon Black | 40 | 40 | 40 | 40 | 40 | 40 |
| Silica | 15 | 15 | 15 | 15 | 15 | 15 |
| Silane Coupling Agent | 1.2 | 1.2 | 1.2 | 1.2 | 1.2 | 1.2 |
| Parrafin Oil | 20 | 20 | 20 | 20 | 20 | 20 |
| Wax | 2 | 2 | 2 | 2 | 2 | 2 |
| Antioxidant | 1.5 | 1.5 | 1.5 | 1.5 | 1.5 | 1.5 |
| Stearic Acid | 2 | 2 | 2 | 2 | 2 | 2 |
| Zinc Oxide 1 | 3 | 3 | 3 | 3 | 3 | 3 |
| Glass Fiber 1 | 15 | — | 15 | — | — | — |
| Glass Fiber 2 | — | — | — | — | — | 15 |
| Carbon Fiber | — | 15 | — | — | — | — |
| Nylon Fiber | — | — | — | — | 15 | — |
| Vulcanization Accelerator | 1 | 1 | 1 | 1 | 1 | 1 |
| Sulfur | 1.5 | 1.5 | 1.5 | 1.5 | 1.5 | 1.5 |
| Method for Molding Tread | Method of FIG. 2 | Method of FIG. 2 | Usual Extrusion | Usual Extrusion | Method of FIG. 2 | Method of FIG. 2 |
| Properties | | | | | | |
| Complex Modulus E1 (Mpa) | 7.2 | 9.5 | 3.5 | 3.2 | 4.4 | 16.3 |
| Complex Modulus E2 (Mpa) | 3.3 | 3.2 | 3.4 | 3.4 | 3.3 | 3.2 |
| Complex Modulus Eα (Mpa) | 8.0 | 9.9 | 8.0 | 3.4 | 4.6 | 18.6 |
| Complex Modulus Eβ (Mpa) | 3.2 | 3.2 | 3.2 | 3.2 | 3.2 | 3.2 |
| (E1 − Eβ)/(Eα − Eβ) × 100 | 83 | 94 | 6 | 0 | 86 | 85 |

TABLE 1-continued

|  | Ex. 1 | Ex. 2 | Com. Ex. 1 | Com. Ex. 2 | Com. Ex. 3 | Com. Ex. 4 |
|---|---|---|---|---|---|---|
| Performance on Ice | 130 | 145 | 100 | 85 | 90 | 85 |
| Performance on Snow | 110 | 115 | 100 | 90 | 95 | 90 |
| Rubber Hardness (−10° C.) | 65 | 63 | 64 | 58 | 60 | 72 |

The tire obtained in Examples 1 and 2, in which the short fiber having a specific Moh's hardness is compounded and oriented in the tread thickness direction, is superior in performance on ice and snow, compared to the tire of Comparative Example 1 in which short fiber is oriented in the tread circumferential direction.

In Comparative Example 1, the short fiber having a specific Moh's hardness is used but not oriented in the tread thickness direction and in Comparative Example 2, short fiber or plate-like material is not compounded in the tread. In Comparative Example 3, short fiber having a Moh's hardness of less than 3 is compounded in the tread and in Comparative Example 4, the tread rubber hardness is higher than 70 degrees. In all of the above Comparative Examples, performance on ice and snow is inferior in comparison to Examples.

EXAMPLES 3 and 5 and COMPARATIVE EXAMPLES 5 to 8

(Process for Forming Tires)

A rubber sheet was prepared according to the compounding ratio and conditions for preparing the tread rubber sheet shown in Table 2. The obtained rubber sheet was used in a tire tread and test tires were formed by the usual method under vulcanization conditions of a temperature of 170° C. and a time of 12 minutes. The following tests and evaluation were conducted using the obtained tire.

(Method for Extruding the Tire Tread Rubber Sheet)
T: A rubber composition is extruded using the apparatus depicted in FIG. 4 and a rubber sheet in which short fiber is oriented perpendicularly to the rubber sheet surface is prepared according to the method depicted in FIG. 3(b).
G: A rubber composition is extruded by the usual method and a tread rubber sheet in which short fiber is oriented parallel to the rubber sheet surface is prepared.

(Complex Elastic Modulus)

The complex elastic modulus was measured using a viscoelasticity spectrometer made by Iwamoto Corporation under the conditions of a temperature of 25° C., frequency of 10 Hz, initial strain of 10% and dynamic strain of 1%. The samples used for measurement was obtained by vulcanizing each extruded rubber sheet at 170° C. for 12 minutes and cutting out therefrom a piece of rubber having a size of 1.0 mm in thickness, 4 mm in width and 5 mm in length. The complex elastic modulus in the extrusion direction of the rubber sheet was defined as Ea and the complex elastic modulus in a 90° direction of the extrusion direction was defined as Eb.

(Performance on Ice)

A tire of a size of 195/65R15 was prepared and mounted on a Japanese front engine/rear wheel drive automobile with an engine size of 2000 cc. Then, the brake stopping distance at a speed of 30 km/h on a board of ice was measured. With Comparative Example 5 as the basis, performance on ice was evaluated by the index found from the following equation. The larger the index is the better the performance on ice.

(Brake stopping distance of Comparative Example 5)÷(Brake stopping distance of each Example)× 100

Before conducting the test, driving to break in the surface of the tire was conducted for 200 km in each Example and Comparative Example.

(Abrasion Resistance)

A tire of a size of 195/65R15 was prepared and mounted on a Japanese front engine/front wheel drive automobile. The groove depth of the tire tread after running a distance of 4,000 km was measured and the distance driven at which the tire groove depth is decreased by 1 mm was calculated. With Comparative Example 5 as the basis, abrasion resistance was evaluated by the index found from the following equation. The larger the index is the better the abrasion resistance.

(Distance driven at which the groove depth of each tire is decreased by 1 mm)÷(Distance driven at which the groove depth of the tire of Comparative Example 5 is decreased by 1 mm)×100

The results are shown in Table 2.

TABLE 2

|  | Ex. 3 | Ex. 4 | Ex. 5 | Com. Ex. 5 | Com. Ex. 6 | Com. Ex. 7 | Ex. 8 |
|---|---|---|---|---|---|---|---|
| Composition (parts by weight) |  |  |  |  |  |  |  |
| NR | 70 | 70 | 70 | 70 | 70 | 70 | 70 |
| BR | 30 | 30 | 30 | 30 | 30 | 30 | 30 |
| Carbon Black | 45 | 45 | 45 | 45 | 45 | 45 | 45 |
| Parrafin Oil | 15 | 15 | 15 | 15 | 15 | 15 | 15 |
| Stearic Acid | 3 | 3 | 3 | 3 | 3 | 3 | 3 |
| Zinc Oxide 2 | 5 | 5 | 5 | 5 | 5 | 5 | 5 |
| Wax | 2 | 2 | 2 | 2 | 2 | 2 | 2 |
| Antioxidant | 2 | 2 | 2 | 2 | 2 | 2 | 2 |
| Glass Fiber 1 | 10 | 5 | 30 | 10 | 1 | 10 | 10 |

TABLE 2-continued

|  | Ex. 3 | Ex. 4 | Ex. 5 | Com. Ex. 5 | Com. Ex. 6 | Com. Ex. 7 | Ex. 8 |
|---|---|---|---|---|---|---|---|
| Sulfur | 1 | 1 | 1 | 1 | 1 | 1 | 1 |
| Vulcanization Accelerator | 1.5 | 1.5 | 1.5 | 1.5 | 1.5 | 1.5 | 1.5 |
| Preparation Conditions | | | | | | | |
| Extrusion Method | T | T | T | G | T | T | T |
| Extrusion Thickness | 10 | 10 | 10 | — | 10 | 30 | 10 |
| Inner Diameter of Tube/ Diameter of mouth ring | 15 | 15 | 15 | — | 15 | 15 | 3 |
| Properties | | | | | | | |
| Eb/Ea | 2.00 | 1.56 | 3.20 | 0.62 | 1.05 | 0.92 | 0.68 |
| Performance on Ice | 140 | 122 | 145 | 100 | 90 | 108 | 102 |
| Abrasion Resistance | 115 | 110 | 108 | 100 | 115 | 102 | 100 |

In Examples 3, 4, and 5 in which a rubber sheet prepared by the process of the present invention is used in the tread, performance on ice and abrasion resistance were improved significantly.

In Comparative Example 5 in which the usual extrusion method was used when preparing a tire tread rubber sheet, the improvement effect of performance on ice was small.

In Comparative Example 6 in which the amount compounded of glass fiber was small when preparing a tire tread rubber sheet, performance on ice grew worse.

In Comparative Example 7 in which the rubber sheet was made thick when preparing a tire tread rubber sheet, the improvement effect of performance on ice and abrasion resistance was small.

In Comparative Example 8 in which the value of the ratio of complex elastic modulus Eb/Ea in the tire tread rubber sheet is less than 1.1, the improvement effect of performance on ice and abrasion resistance was small.

The studless tire of the present invention is excellent in performance on ice and snow in which digging friction is improved without losing adhesion friction on icy and snowy roads.

A rubber sheet having short fiber oriented in a specific direction to a sufficient orientation degree can easily be obtained by the process for preparing the rubber sheet of the present invention.

A studless tire excellent in performance in ice and in which adhesion friction and digging friction are improved can be obtained by the process for preparing the tread of the present invention.

What is claimed is:

1. A process for preparing a studless tire having a tread comprising a rubber sheet having a thickness of at most 20 mm, which comprises:

extruding a rubber composition containing 2 to 50 parts by weight of short fiber or plate-like material having a Moh's hardness of 3–7 based on 100 parts by weight of diene rubber in a tube shape, thereby orienting said short fiber or plate-like material in the circumferential direction of said tube shaped rubber composition;

cutting said tube shaped rubber composition at one point in a sidewall thereof in the extrusion direction to obtain a rubber sheet having a complex elastic modulus Ea in the extrusion direction and complex elastic modulus Eb in the 90° direction from the extrusion direction measured at 25° C. which fulfill the following equation:

$$1.1 \leq Eb/Ea;$$

cutting said rubber sheet parallel to the extrusion direction to obtain pieces;

rotating each piece 90° and laminating the rotated pieces together to form a tread having a thickness of at most 20 mm; and forming a studless tire having said tread.

2. The process of claim 1, wherein said short fiber or plate-like material is short fiber having an average fiber diameter of 1 to 100 μm and average length of 0.1 to 5 mm or plate-like material having an average thickness of 1 to 90 μm and average length of 0.1 to 5 mm.

* * * * *